US007614002B2

(12) United States Patent
Goldfeder et al.

(10) Patent No.: US 7,614,002 B2
(45) Date of Patent: Nov. 3, 2009

(54) METHOD AND SYSTEM FOR PROTECTING INTERNET USERS' PRIVACY BY EVALUATING WEB SITE PLATFORM FOR PRIVACY PREFERENCES POLICY

(75) Inventors: Aaron R. Goldfeder, Seattle, WA (US); Cem Paya, Seattle, WA (US); Frank M. Schwieterman, Seattle, WA (US); Darren Mitchell, Woodinville, WA (US); Rajeev Dujari, Kirkland, WA (US); Stephen J. Purpura, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 11/174,259

(22) Filed: Jul. 1, 2005

(65) Prior Publication Data

US 2005/0257250 A1 Nov. 17, 2005

Related U.S. Application Data

(63) Continuation of application No. 09/999,175, filed on Nov. 30, 2001, now Pat. No. 6,959,420.

(51) Int. Cl.
*G06F 3/00* (2006.01)
*G06F 21/00* (2006.01)
*H04L 29/06* (2006.01)
(52) U.S. Cl. .................. 715/745; 715/740; 715/742; 709/224; 709/226; 713/183; 713/172; 713/159
(58) Field of Classification Search ................. 715/745, 715/740, 742; 709/224, 226; 713/183, 185, 713/175, 172, 159, 155
See application file for complete search history.

(56) References Cited

U.S. PATENT DOCUMENTS 5,581,059 A 12/1996 Chang ........................... 707/9
5,826,242 A 10/1998 Montulli ..................... 705/27

(Continued)

FOREIGN PATENT DOCUMENTS

GB 2364408 A 1/2002

OTHER PUBLICATIONS

Koch et al., "Platform for Privacy Preferences Project Present and Future," 6.805 Ethics and Law on the Electronic Frontier, May 17, 2001.

(Continued)

*Primary Examiner*—Tadeese Hailu

(57) ABSTRACT

A system and method that evaluates privacy policies from web sites to determine whether each site is permitted to perform operations (e.g., store, retrieve or delete) directed to cookies on a user's computer. Various properties of each cookie and the context in which it is being used are evaluated against a user's privacy preference settings to make the determination. An evaluation engine accomplishes the evaluation and determination via a number of criteria and considerations, including the cookie properties, its current context, the site, the zone that contains the site, and any P3P data (compact policy) provided with the site's response. The user privacy preferences are evaluated against these criteria to determine whether a requested cookie operation is allowed, denied or modified. A formalized distinction between first-party cookies versus third-party cookies may be used in the determination, along with whether the cookie is a persistent cookie or a session cookie.

19 Claims, 7 Drawing Sheets

U.S. PATENT DOCUMENTS

| | | | |
|---|---|---|---|
| 6,151,686 A | 11/2000 | McDonough et al. | 714/37 |
| 6,154,777 A | 11/2000 | Ebrahim | 709/227 |
| 6,496,824 B1 | 12/2002 | Wilf | 707/10 |
| 6,691,113 B1 | 2/2004 | Harrison et al. | 707/10 |
| 6,714,778 B2 | 3/2004 | Nykanen et al. | 455/414.1 |
| 6,848,000 B1 | 1/2005 | Reynolds | 709/226 |
| 2001/0049620 A1 | 12/2001 | Blasko | 705/10 |
| 2002/0055912 A1 | 5/2002 | Buck | 705/76 |
| 2002/0059425 A1 | 5/2002 | Belfiore et al. | 709/226 |
| 2002/0103896 A1 | 8/2002 | von Klopp Lemon | 709/224 |
| 2002/0104015 A1 | 8/2002 | Barzilai et al. | 713/201 |
| 2002/0133500 A1 | 9/2002 | Arlein et al. | 707/102 |
| 2002/0143770 A1 | 10/2002 | Schran et al. | 707/10 |
| 2003/0088520 A1 | 5/2003 | Bohrer et al. | 705/74 |
| 2004/0054598 A1 | 3/2004 | Kall et al. | 705/26 |

OTHER PUBLICATIONS

Microsoft P3P Implementation In Internet Explorer 6.0 and Window XP Fact Sheet, Mar. 1, 2001.

Karen Coyle, A response to P3P and Privacy: An Update for the Privacy Community S by the Center for Democracy and Technology, May 2000.

Herrewegen et al., "E-P3P Privacy Policies," Oct. 25, 2001.

Kristol et al. "HTTP State Management Mechanism" Oct. 2000. Request for Comments (RFC 2965). Retrieved from http://www.gaqs.org/ftp/rfc/pdf/rfc2965.txt.pdf on May 9, 2005.

Gutzmann, K.; Access control and session management in the HTTP environment: Internet Computing, IEEE00vol. 5, Issue 1, Jan.-Feb. 2001 pp. 26-35.

Hetherington et al. (U.S. Appl. No. 09/461,507) Dec. 14, 1999.

METHOD AND SYSTEM FOR PROTECTING INTERNET USERS' PRIVACY BY EVALUATING WEB SITE PLATFORM FOR PRIVACY PREFERENCES POLICY

CROSS-REFERENCE TO RELATED APPLICATION

This is a continuation of U.S. patent application Ser. No. 09/999,175 filed Nov. 30, 2001.

RELATED APPLICATION

This application is related to United States Patent application entitled "SYSTEM AND METHOD FACILITATING CONTEXTUAL AND/OR DOWNGRADED COOKIES," Ser. No. 09/998,702, filed on the same day, and assigned to the same assignee as the present application.

FIELD OF THE INVENTION

The invention relates generally to computer systems and the Internet, and more particularly to Internet privacy.

BACKGROUND OF THE INVENTION

The Internet, which in essence includes a large number of networked computers distributed throughout the world, has become an extremely popular source of virtually all kinds of information. Increasingly sophisticated computers, software, and networking technology have made Internet access relatively straightforward for end users. For example, conventional browser software allows a user to request information such as a web page from a web site on one or more remote computers. To this end, the user provides the address of the web page (e.g., a uniform resource identifier, or URI) in some manner to the browser software, and the browser software transmits the request using a well known communication protocol such as the HyperText Transport Protocol (HTTP). The request is then routed to the destination computer or web site based on the address.

When the request is received, the remote web site evaluates the request and returns an appropriate response, which may include the information requested in some formatted content, e.g., a HyperText Markup Language (HTML) format. The browser software parses and interprets the returned content to render a page or the like upon the user's computer display.

When accessed, some web sites attempt to store information on the user's computer, in a small text file referred to as a cookie. Many times this is desirable to the user, e.g., so that the user does not have to repeatedly resubmit information manually to the remote computer hosting the web site, but instead can automatically provide the information as stored in the cookie. For example, a user can allow cookies to be stored on his or her computer so as to be able to view some web sites, and/or to take advantage of desirable customization features, such as local news and weather, or stock quotes. Such a cookie is likely a persistent cookie, which remains on the user's computer when the browsing software is closed, so that the cookie can be read by the web site that created it when that site is later revisited. Alternatively, a temporary or session cookie may be stored on a user's computer only for the current browsing session. Such a cookie is deleted from the computer when the browsing software is closed.

While some cookies are thus valuable to users, other cookies allow abuse of the user's privacy, essentially by allowing access to personally identifiable information that may be used for a secondary purpose, without the user's consent or knowledge. For example, less-than-trustworthy web sites can invade a user's privacy by tracking other web sites that the user has visited. Such a site may do this by storing a cookie on the user's machine, and then having advertisements or the like embedded in other web sites. When such other web sites are visited, the embedded web site can retrieve its cookie, identifying the user, along with the name of the web page the user is trying to access, and thereby obtain information indicating that the user visited the specific site. Over time, this information may be collected and analyzed to profile a user's web surfing habits across a set of web sites. Such information may be used for many purposes even though a user would not want that information known. For example, the information may be used for targeted advertising, resold to others, and so forth.

In sum, cookies are widely used in data collection, but simply disabling cookies is impractical because many users benefit from legitimate ones upon which applications depend. A solution such as prompting the user before allowing any cookie storage (or recall) is undesirable because such prompting interrupts and annoys many users. At the same time, however, many web users are increasingly concerned that web sites can use cookies or the like to locate them in the physical world, profile them in the virtual world, and/or correlate this information to obtain an essentially complete user identity picture. Many web users also express concerns over web sites sharing their personal data with other parties, such as for online behavior analysis. Still further, many other users are unaware of such data collection practices, or at least the extent of it and the specific details being collected, and thus are uncertain as to what actions can be taken to counter such activity and reasonably protect personal privacy.

SUMMARY OF THE INVENTION

Briefly, the present invention provides a system and method that evaluates privacy policies provided by web sites to determine whether each site is permitted to perform operations (e.g., store, retrieve or delete) directed to cookies on a user's computer. This evaluation and determination is performed by considering various properties of each cookie and the context in which it is being used, along with the privacy policy specified by the web site, with respect to the user's privacy preferences and other specified information (criteria) available on the client computer.

In one implementation, a Platform for Privacy Preferences (P3P) evaluation engine accomplishes the evaluation and determination via a number of criteria and considerations. Evaluation criteria may include the type of cookie and its current context, the site, the security zone that contains the site, and/or the P3P data (compact policy) provided with the site's response. The user privacy preferences and/or other user settings are evaluated with respect to this criteria to determine whether a requested cookie operation is allowed or denied, or modified in some way. For example, instead of simply allowing or denying storage of a cookie that the site is requesting to persist, the type of storage can be downgraded such that the cookie is only temporarily kept during a browsing session, that is, converted from a persistent cookie to a session cookie.

The evaluation can turn on a formalized distinction between first-party cookies versus third-party cookies, wherein a first-party cookie either originates on or is sent to the web site a user is currently viewing, while a third-party cookie either originates on or is sent to a web site that is different from the one the user is currently viewing. In other words, third party cookies are those where the domain of the cookie is different from the domain of the top level, or navigated, page. Note that first-party and third-party cookies may be persistent or session cookies, and the P3P evaluation engine can base its determination in part on this distinction. Legacy cookies that existed on a machine (prior to the evaluation engine having been installed) are also handled in certain ways, e.g., not recalled (replayed) for requests to third-parties.

Other advantages will become apparent from the following detailed description when taken in conjunction with the drawings, in which:

DETAILED DESCRIPTION

Exemplary Operating Environment

Figure 1:
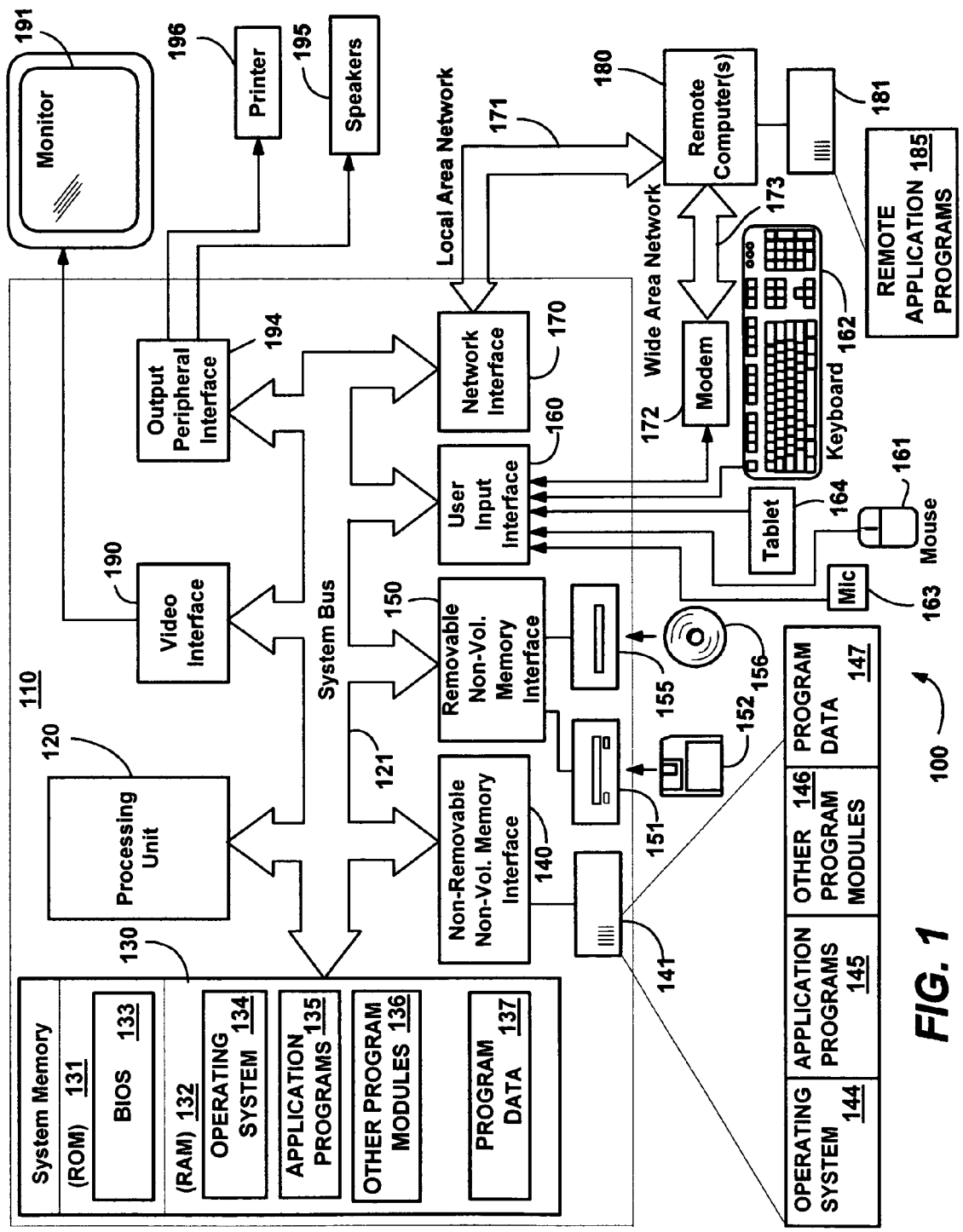
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 47. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network: (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data nay be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Internet Privacy Control

One aspect of the present invention is generally directed to the concept of cookies, which typically comprise small text files written by web sites to a machine that is requesting content from those sites. There are various types (properties and/or contexts) of cookies, and as will be described below, privacy-related decisions may be made based on various criteria, including the cookie types. Examples of various types of cookies are set forth herein, and also can be found in the related copending patent application entitled "SYSTEM AND METHOD FACILITATING CONTEXTUAL AND/OR DOWNGRADED COOKIES," which is hereby incorporated by reference herein in its entirety.

For example, cookies can either be persistent or temporary. A persistent cookie is one stored on a computer that accesses a web site as a file that remains there after the browsing session is completed, e.g., when the browser code is closed. A persistent cookie can be read by the web site that created it when that site is visited again. A temporary or session cookie is stored only for the current browsing session, and is deleted from the computer when the browser software is closed.

Another criterion for a cookie is whether that cookie is a first party or third party cookie, depending on how the site providing the cookie relates to the site to which the user has navigated. A first-party cookie either originates on or is sent to the web site that a user is currently viewing. Such first party cookies are commonly used to store information, such as the user's preferences when visiting that site. A third-party cookie either originates on or is sent to a web site different from the one the user is currently viewing. Third-party web sites typically provide some of the content on the Web site that a user is viewing. For example, many sites use advertising from third-party web sites, and those third-party web sites may use cookies. A common use for this type of cookie is to track web page usage for advertising or other marketing purposes. First-party and/or third-party cookies can be persistent or temporary.

These various cookie-related concepts are described in more detail below with respect to their usage in controlling privacy. Notwithstanding, it will be appreciated that the present invention is not limited to cookie files as conventionally understood, or any other type of cookie data, but rather contemplates virtually any information in any form that one computer can use with respect to another computer. Thus, as used herein, the term. "cookie," "cookie data", "cookie file" and the like represent such information, regardless of how it is identified, formatted, provided, maintained, and so on.

Figure 2:
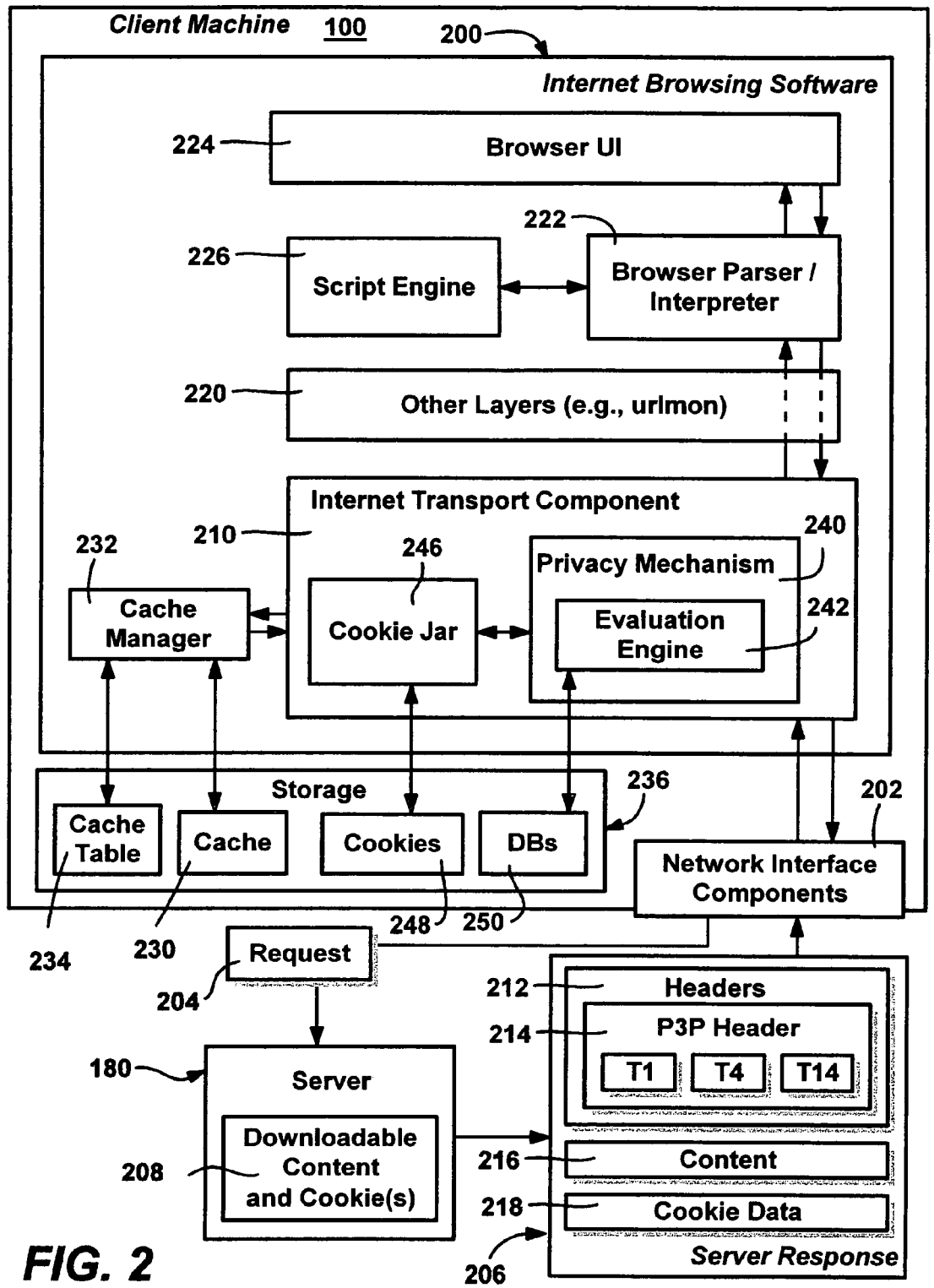
FIG. 2 is a block diagram generally representing various components for evaluating privacy in accordance with one aspect of the present invention.

FIG. 2 shows a generalized conceptual model of the present invention wherein browsing software 200 executing in a client machine (e.g., the computer system 110 of FIG. 1)

communicates via a network interface software and hardware 202 with a remote server (e.g., one of the remote computer(s) 180 of FIG. 1). The communication may include requests for content or the like (e.g., HTTP "GET" requests) such as the request 204, and result in responses such as the response 206 being received from the server 180. Communication between the client 110 and the server 180 typically uses a well-known network protocol, such as hypertext transfer protocol (HTTP). As used herein, "server" or "network server" includes any machine or combination of machines having content and (in keeping with an aspect of the present invention as described below) cookies maintained thereon or in association therewith, shown in FIG. 2 as the block labeled 208. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

As further represented in FIG. 2, an internet transport component 210 (e.g., wininet.dll) handles much of the processing of the response 206. Part of the response 206 comprises headers 212, which may include a Platform for Privacy Preferences (P3P) header 214, such as formatted in accordance with a P3P header standard as published (e.g., accessible via http://www.w3.org) by the World Wide Web Consortium (W3C*). As is known, many web sites provide privacy statements as written documents that can be viewed. Web sites also may provide P3P privacy policy data.

To this end, in one implementation generally represented in FIG. 2, the P3P header 214 includes compact policy data, e.g., in the form of a string that may include some number of tokens that represent a web site's privacy policy data in a compact form. In FIG. 2, arbitrarily labeled tokens T1, T4 and T14 are shown. As also represented in FIG. 2, the server response 206 may include the requested content 216 and/or cookie (data) 218.

When content 216 is returned, the content is passed from the internet transport component 210 (possibly though other layers of code 220) to browser parser/interpreter code 222 that parses and interprets the content for displaying to the user via a browser user interface 224. The browser parser/interpreter code 222 may invoke a script engine 226 as needed to interpret any script embedded in or referenced by the content. Similar content also may be stored in a local cache 230 accessed via a cache manager 232 that is included in or otherwise associated with the internet transport component 210. For example, the cache manager component 232 manages the cache by maintaining site-to-local-file mappings in a cache table 234 or the like, such that the content and related data may be locally accessed as appropriate. Note that although FIG. 2 shows a single storage unit 236 (e.g., the hard disk drive 141 of FIG. 1) as maintaining the various data, as is understood the data may be maintained in and/or distributed among separate storage units.

In accordance with one aspect of the present invention, the internet transport component 210 includes or is otherwise associated with a (logical) privacy mechanism 240 that includes an evaluation engine 242 which, in general, determines whether a cookie operation will be allowed to be performed (and if so, to what extent) by a cookie storage mechanism, referred to as a cookie jar 246. To this end, when invoked, such as when called by the cookie jar 246, the evaluation engine 242 evaluates any privacy policies (e.g., as present in the compact policy in the P3P header 214) provided by a web site to determine whether that site is permitted to persist, retrieve (referred to as replay) or delete its cookie data 218 in the set of cookies 248 on the machine 110. As described below, this determination is done by considering properties of the cookie and the context in which it is being used, along with the privacy policy specified by the web site, and comparing this information to the users' privacy preferences and other specified information as maintained in privacy-related information stores, shown in FIG. 2 as databases 250. In general, any of the criteria that are available to the evaluation engine 242, regardless of how obtained or determined, may be used in the evaluation and determination process. Such "available criteria" include, for example and without limitation, cookie-related properties or contexts, per-site data, security settings, (e.g., zone data), privacy settings/preferences/rules, the absence of valid and/or relevant site-provided policy data, how the cookie action is being requested, (e.g., script or tag), and so forth.

Note that as described below, the determination may be an automatic allow or deny, or require user input via a prompt. A determination may also downgrade a cookie from a persistent cookie to a session cookie, and/or leash a cookie, which means that a cookie may be stored, but will not be allowed to be replayed in a third party context. Note that replay of a cookie is dependent on whether it was leashed or not at cookie set time. If the cookie was leashed and the current request is a third party request, the cookie is suppressed. Flags or the like may be maintained in association with the cookie to preserve these states.

Figure 3:
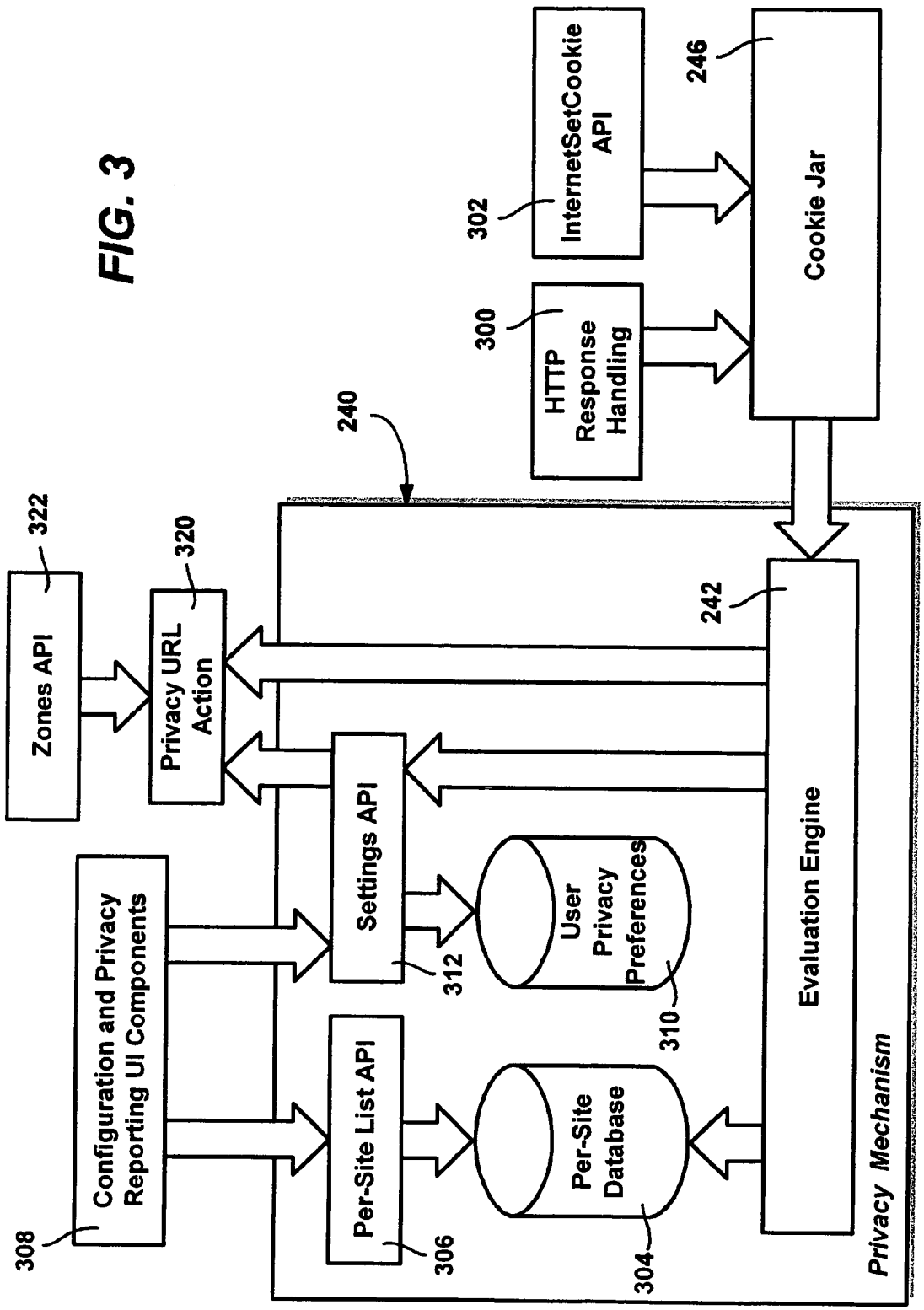
FIG. 3 is a block diagram generally representing a privacy mechanism including an evaluation engine that determines whether to allow or deny Internet cookie-related operations in accordance with one aspect of the present invention.

FIG. 3 represents one suitable implementation of the general components that can be logically thought of as comprising the privacy mechanism 240, including the evaluation engine 242, along with various other components connected thereto. In general, to request a cookie-related operation, the cookie jar 246 can be accessed in at least two ways, including via HTTP response handling code 300 (e.g., via a meta tag interpreted by the browser parser/interpreter code 222 that requests a cookie be set) and/or via script. With script, the script engine 226 calls an InternetSetCookie( ) API 302 that similarly requests that a cookie be set. The exchange of data for these operations are described below with respect to FIG. 4, however for now it suffices to understand that a server response (e.g., 206) may be requesting storage of a cookie.

Similarly, when a web site via a server response or other communication requests that a cookie be recalled from storage and provided to the site, referred to as a replay operation (or "replaying," "replayed" and so forth), the cookie jar 246 is accessed. Still further, cookie deletion requests are received at the cookie jar 246.

In accordance with one aspect of the present invention, when accessed for a cookie-related operation, e.g., for cookie-related storing, replaying or deleting, the cookie jar 246 calls into the evaluation engine 242 for a determination as to whether the requested operation is to be allowed. In turn, the evaluation engine 242 evaluates various criteria to determine the privacy impact and thereby determine whether the requested operation may proceed. As described below, particularly with respect to the flow diagrams of FIGS. 5-7, the evaluation engine 242 executes code that takes the various sets of relevant information and determines therefrom whether the requested cookie operation is allowed. The criteria in the evaluation may include a web site's P3P compact policy, if any is provided, along with user privacy preferences, and characteristics of the operation itself.

More particularly, one aspect of the present invention is directed to a formalization of the concept of first party cookies versus third party cookies and a distinction between them with respect to privacy. A cookie is set on a domain or a host, and when a request directed to this domain or host is made at some point later in time, the cookie may be replayed. Initially, the browsing software 200 is directed to navigate to a URL (uniform resource locator, or URI, uniform resource identifier), which is the top level document, for example, http://www.anysite.com. For each URL downloaded as a dependency of the top level document, the host name is compared from right to left with the host name of the top level document to see if they match. If there is a mismatch in the name, the download is considered THIRD PARTY. If one of the names ends before a mismatch is found, the download is considered FIRST PARTY.

The following table sets forth examples:

| Top Level | Dependency | Result |
| --- | --- | --- |
| www.anysite.com | www.anysite.com | First Party |
| www.anysite.com | anysite.com | First Party |
| www.anysite.com | othersite.com | Third Party |
| foo.anysite.com | bar.anysite.com | First Party |
| foo.anysite.com | anysite.com | First Party |
| foo.anysite.com | bar.foo.anysite.com | First Parry |

When the browser parser/interpreter 222 processes the content, these dependencies are detected and passed along with a flag or the like that indicates their first or third party status to the evaluation engine 242, e.g., via a protocol stack. In keeping with one aspect of the present invention, first party and third party cookies may be distinguished from one another with respect to locally controlling (e.g., allowing, denying, downgrading, prompting for or leashing) cookie-related operations.

In addition to first or third party data, the evaluation engine 242 may distinguish between persistent and session cookies as described above. As a general rule, there is a higher threshold (lesser privacy settings) to store a persistent cookie than a session cookie. Indeed, one result is to downgrade a cookie from a persistent to a session cookie, meaning the cookie can be stored, but only temporarily (e.g., during the browsing session).

In addition to the cookie's criteria, the evaluation engine may also refer to a per-site list that allows users to have a more-refined control over which sites are allowed to store cookies. For any specific site, users can specify an action for each site, either accept, i.e., always accept cookies from this site, deny, i.e., always reject cookies from this site, or use policy, i.e., perform normal evaluation of any P3P policy provided to determine whether to allow cookie-directed actions.

To make such site-based determinations, the evaluation engine 242 accesses a database 304 or the like comprising a per-site store relating sites to user settings. The database 304 may be accessed through a per-site list API 306, or the like, including by components 308 directed to user configuration and/or privacy reporting via user interface operations, while the evaluation engine 242 may be arranged to access the store 306 directly. For example, the user can specify sites through the browsing software's user interface 224, or via a utility program. The per-site database 304 maintains a list of specific web sites and the rules to be used when manipulating cookies for that web site, e.g., this store can specify sites for which cookies should always be accepted, never be accepted, or for which P3P evaluation should take place, as described below.

Another set of components of the privacy mechanism 240 is directed to storing the user's preference settings, in a preferences store 310, accessible via a settings API 312. The preferences store 310 contains the settings that relate to the P3P compact policy evaluation, and may be set from the configuration UI 308, e.g., the browser user interface 222. For example, the user may move a slider bar that sets one of six privacy levels, each of which have settings related to P3P tokens in the compact policy. For example, a "No Cookies" setting may be chosen, which if selected, does not accept or send any cookies (session and persistent), does not delete cookies, does not replay legacy cookies, and the per-site list does not override such rules. An example of a "Low" setting may be one that accepts all cookies, replays all cookies including Legacy Cookies, and the per-site list does not override such rules.

The tables below set forth other examples for possible settings:

| | High | |
| --- | --- | --- |
| | First party context | Third party context |
| Persistent cookie No Compact Policy | Deny | Deny |
| Persistent cookie Unsatisfactory Cookie | Deny - also deny if the policy purposes or recipients above have an opt-out attribute. | Deny - also deny if the policy purposes or recipients above have an opt-out attribute. |
| Persistent cookie with other policies | Accept | Accept |
| Session Cookies | Treat same as persistent | Treat same as persistent |
| Legacy Cookies | Leash | leash |
| Per site list overrides? | Yes | Yes |

Note that the notion of what makes a cookie "unsatisfactory" is somewhat strengthened for first and third parties in the High setting by also denying cookies with policies that use an 'opt-out' attribute.

| | Medium High | |
| --- | --- | --- |
| | First party context | Third party context |
| Persistent cookie No Compact Policy | Leash | Deny |
| Persistent cookie Unsatisfactory Cookie | Deny | Deny - also deny if the policy purposes or recipients above have the opt-out attribute. |
| Persistent cookie with other policies | Accept | Accept |
| Session Cookies | Accept | Treat same as persistent |
| Legacy Cookies | Leash | leash |
| Per site List overrides? | Yes | Yes |

Note that the notion of unsatisfactory is somewhat strengthened for Third parties in Medium High by also denying cookies with policies that use the 'opt-out' attribute.

| | Medium - Default Setting | |
| --- | --- | --- |
| | First party context | Third party context |
| Persistent cookie No Compact Policy | Leash | Deny |

-continued

Medium - Default Setting

|  | First party context | Third party context |
|---|---|---|
| Persistent cookie Unsatisfactory Cookie | Downgrade | Deny |
| Persistent cookie with other policies | Accept | Accept |
| Session Cookies | Accept | Treat same as persistent |
| Legacy Cookies | Leash | Leash |
| Per Site list overrides? | Yes | Yes |

Medium Low

|  | First party context | Third party context |
|---|---|---|
| Persistent cookie No Compact Policy | Leash | Downgrade |
| Persistent cookie Unsatisfactory Cookie | Accept | Downgrade |
| Persistent cookie with other policies | Accept | Accept |
| Session Cookies | Accept | Treat same as persistent |
| Legacy Cookies | Leash | Leash |
| Per site list overrides? | Yes | Yes |

The following table sets forth example settings for deleting a cookie in the medium settings:

Cookie Delete in Medium

|  |  | First | Third |
|---|---|---|---|
| Leashed | Change value | Typical P3P eval | Typical P3P eval |
| Leashed | Delete | Always allowed invariant of CP (compact policy) | No Delete |
| Legacy leashed | Delete | Always allowed invariant of CP | Always allowed invariant of CP |
| Unleashed | Change value | Typical P3P eval | Typical P3P eval |
| Unleashed | Delete | Always allowed invariant of CP | Always allowed invariant of CP |

Delete of legacy leashed cookies is allowed from the third party context invariant of compact policy.

The privacy settings also may be set or manipulated via import functionality. For example, an ImportPrivacySettings function is provided to process and import an Extensible Markup Language (XML) file that contains customized privacy preferences, such as using the Extensible Markup Language (XML) elements defined below:

| XML Element | Definition |
|---|---|
| alwaysReplayLegacy | Specifies to always replay legacy cookies. |
| if_policy_cookieaction | Specifies a rule describing how to act on a cookie based on its compact policy |
| firstparty | Specifies rules for first-party cookies. |
| flushCookies | Specifies that all cookies be deleted when custom settings are loaded. |
| flushSiteList | Specifies that the privacy per-site list be deleted when custom settings are loaded. |
| MSIEPrivacy | Specifies custom privacy settings. |
| MSIEPrivacySettings | Specifies custom privacy settings as a function of security zone, Web page context (first-party vs. third-party), type (session vs. persistent cookie) and the content of a cookie's Platform for Privacy Preferences (P3P) compact policy. |
| MSIESiteRules | Specifies privacy per-site rules for cookies. |
| p3pCookiePolicy | Specifies how to handle cookies based on the P3P compact policy. |
| site | Specifies the per-site rules for a Web site. |
| thirdparty | Specifies rules for third-party cookies. |

The preferences store 310 provides data to the evaluation engine 242 indicating which P3P tokens are to be accepted or rejected, and under what circumstances.

A privacy URL action component 320 is also provided, which comprises an instance of a URL action used to describe a behavior the browser software 200 should take with respect to privacy preferences. This URL action 320 comprises a global override that has three states, namely accept all cookies, reject all cookies, or proceed with P3P compact policy evaluation. One primary function of this feature is to determine whether to accept cookies coming in from a web site or set through script, or replay a cookie to a given host on a given HTTP request.

In general, sites may correspond to one of four zones, namely an Internet zone, a local intranet zone, a trusted sites zone, and a restricted sites zone. The Internet zone, by default, contains anything that is not on the user's computer, on an intranet, or assigned to any other zone. As can be appreciated, default settings and user adjustments thereto in general tend to be more conservative with respect to security and/or privacy when the user is accessing a site contained in the Internet zone, due to the number of unknowns that exist on with Internet sites in general. For example, the user can set the browsing software 200 to generate a prompt (at least the first time) via the UI 224 before any cookie can be saved from an Internet zone site. The response to the prompt may be stored in association with this particular site so that the user need not again be interrupted when this site is accessed.

A Local intranet zone typically contains any addresses that do not require a proxy server, as defined by the system administrator. These may include sites identified by network paths (such as \\computername\foldername), and local intranet sites (typically addresses that do not contain periods, such as http://internal). A user or administrator can add sites to this zone, such as via a user interface. Since sites in such a zone are more trusted, the default settings tend to be such that the evaluation engine 242 allows cookie operations from web sites in this zone, although of course the actual settings determine the result.

The Trusted sites zone corresponds to sites that the user (or administrator) specifically believes can be sufficiently trusted such that files can be downloaded and/or run therefrom without worrying about damage to the user's computer or data. Such sites may be those having well-established, positive reputations, and the user can assign sites to this zone. Since such sites are trusted, security and privacy defaults to being relatively low, e.g., the default settings are such that the evaluation engine 242 will by default allow cookie-related operations from web sites in this zone to be performed on the user's computer and read by the web site that created them, at least for first-party cookies.

A restricted sites zone is essentially for sites that are the opposite of trusted sites. This zone contains sites the user does not trust, or is at least uncertain as to whether files can be safely downloaded and/or run from these sites. The user can assign sites to this zone. Default security and privacy levels for restricted sites zone is relatively high, e.g., by default the evaluation engine 242 may block the cookie operations from any web sites in this zone.

The global URL action evaluation and user preference setting evaluation performed by the evaluation engine 242 are zone dependent, i.e., per-zone. For example, global rules such as "reject all cookies from any sites in the restricted sites zone" but "use P3P evaluation for Internet zone sites" may be set. Further, the user preference settings depend on zone and cookie type (first or third party, persistent or session) combinations. Thus, for example, there may be sixteen combinations when using four zones, that is, four zones by two (first or third) party types by two (persistent or session) cookie-storage types. Note however that per-site information, (where the user identifies a specific site and controls the settings for it), is not zone dependent, except to the extent that a zone-dependent global URL action 320 may prevent the per-site information 304 from ever being evaluated, as described below with respect to FIG. 5.

Thus, the user can control and customize privacy by changing privacy levels on a per-zone basis, or, the user can customize the settings within a zone. The user can also customize settings for a zone by importing a privacy settings file, such as from a certificate authority.

In one implementation, rules are set and retrieved via functions, such as a PrivacySetZonePreferenceW Function and a PrivacyGetZonePreferenceW. The PrivacySetZonePreferenceW Sets the privacy settings for a given URLZONE and PrivacyType. The following tables describes this function:

```
DWORD PrivacySetZonePreferenceW(
    DWORD dwZone,
    DWORD dwType,
    DWORD dwTemplate,
    LPCWSTR pszPreference
);
```

The dwZone parameter specifies the URLZONE for which privacy settings are being set. The dwType parameter specifies the PrivacyType for which privacy settings are being set. The dwTemplate parameter specifies which of the PrivacyTemplates is to be used to set the privacy settings. If dwTemplate is set to PRIVACY_TEMPLATE_CUSTOM, the pszPreference parameter is the string representation of the custom preferences, otherwise, it is ignored. The function returns zero if successful, otherwise an errorcode is returned. For simplicity, the privacy options can be accomplished by moving a slider bar on a user interface to set the PrivacyTemplates for PrivacyTypes. Custom privacy preferences for a given URLZONE and PrivacyType can be set through the pszPreference parameter. The pszPreference parameter can contain a series of rules separated by white space describing the privacy preferences. Note that the rules themselves cannot contain white space. The pszPreference has the following structure, where there can be multiple logical rules:

<signature><logical-rule><special-rule> wherein, for example, the signature may be set to "IE6-P3PSettings/V1:".

Logical rules have the following format:

/<expression>=<decision>

An expression is a Boolean statement composed of compact policy tokens using the operators "&" (logical AND) and "!" (logical NOT). In one implementation, the compact policy token is case-sensitive. The decision is a single lowercase character that defines the action to take on the cookie whose compact policy contains the specified token or tokens. The following table lists valid decision characters:

| Character | Definition |
| --- | --- |
| a | Accept cookie |
| p | Prompt user to accept or deny the cookie |
| r | Reject the cookie |
| l | Leash the cookie (only send it in a first-party context) |
| d | Downgrade the cookie, if it is a persistent cookie, to a session cookie. |

Logical rules are evaluated in the order they are listed. The first logical-rule to be matched, if any, determines the cookie action. An empty expression is also allowed. If an expression is empty, the left-hand side evaluates to true. This form of a logical-rule can be used at the end of a set of rules to catch all situations that did not fall into the other categories. The following examples show valid logical rules:

/DEM=d/
    Deny a cookie whose compact policy contains the DEM token
/CON&!TEL=a/
    Accept a cookie whose compact policy contains the CON token and does not contain the TEL token
/=a/
    Accept all cookies Special rules may be specified using the nopolicy, session, and always symbols. The nopolicy symbol is used to specify the action to taken when there is no compact policy. For example nopolicy=d specifies to downgrade all cookies without a compact policy to session cookies. The session symbol is used to specify the action to take on session cookies, and can only be set to a. When session=a is specified, session cookies are accepted regardless of the content of the compact policy. If this rule is not specified, session cookies are subject to the same rules as persistent cookies. Also, the always symbol is used to specify to perform the same action for everything. For example, always=d specifies to deny all cookies regardless of the existence of a compact policy. Note that always=d is equivalent to /=d/.

The following example shows a privacy preferences string that specifies to accept cookies for which the compact policy contains a FIN/CONi token pair, reject cookies with compact policies containing FIN/CON, FIN/CONo, FIN/CONa and GOV/PUB token pairs or a TEL token, and to prompt the user when a cookie's compact policy contains the UNR token. It also specifies downgrading cookies without a compact policy to session cookies, and to accept all cookies that do not match one of the given rules. Note that the first rule that evaluates to true determines the cookie action:

```
IE6-P3PSettings/V1: /FIN&CONi=a/ /FIN&CONo=r/ /FIN&CONa=r/
/FIN&CON=r/ /GOV&PUB=r/ /TEL=r/ /UNR=p/ nopolicy=d /=a/
```

Rules are retrieved using the PrivacyGetZonePreferenceW Function. This function retrieves the privacy settings for a given URLZONE and PrivacyType, and has the following format:

```
DWORD PrivacyGetZonePreferenceW(
    DWORD dwZone,
    DWORD dwType,
    LPDWORD pdwTemplate,
    LPWSTR pszBuffer,
    LPDWORD pdwBufferLength
);
```

The dwZone parameter specifies the URLZONE for which privacy settings are being retrieved. The dwType parameter specifies the PrivacyType for which privacy settings are being retrieved. The pdwTemplate parameter returns a pointer to a DWORD containing which of the PrivacyTemplates is in use for this dwZone and dwType. The pszBuffer parameter that points to a buffer representing a string version of the pdwTemplate or a customized string if the pdwTemplate is set to PRIVACY_TEMPLATE_CUSTOM, as described above. The pdwBufferLength contains the buffer length in characters. If the buffer length is not sufficient, PrivacyGetZonePreferenceW returns with this parameter set to the number of characters required and with a return value of ERROR_MORE_DATA. The function returns zero if successful or an errorcode.

Figure 4:
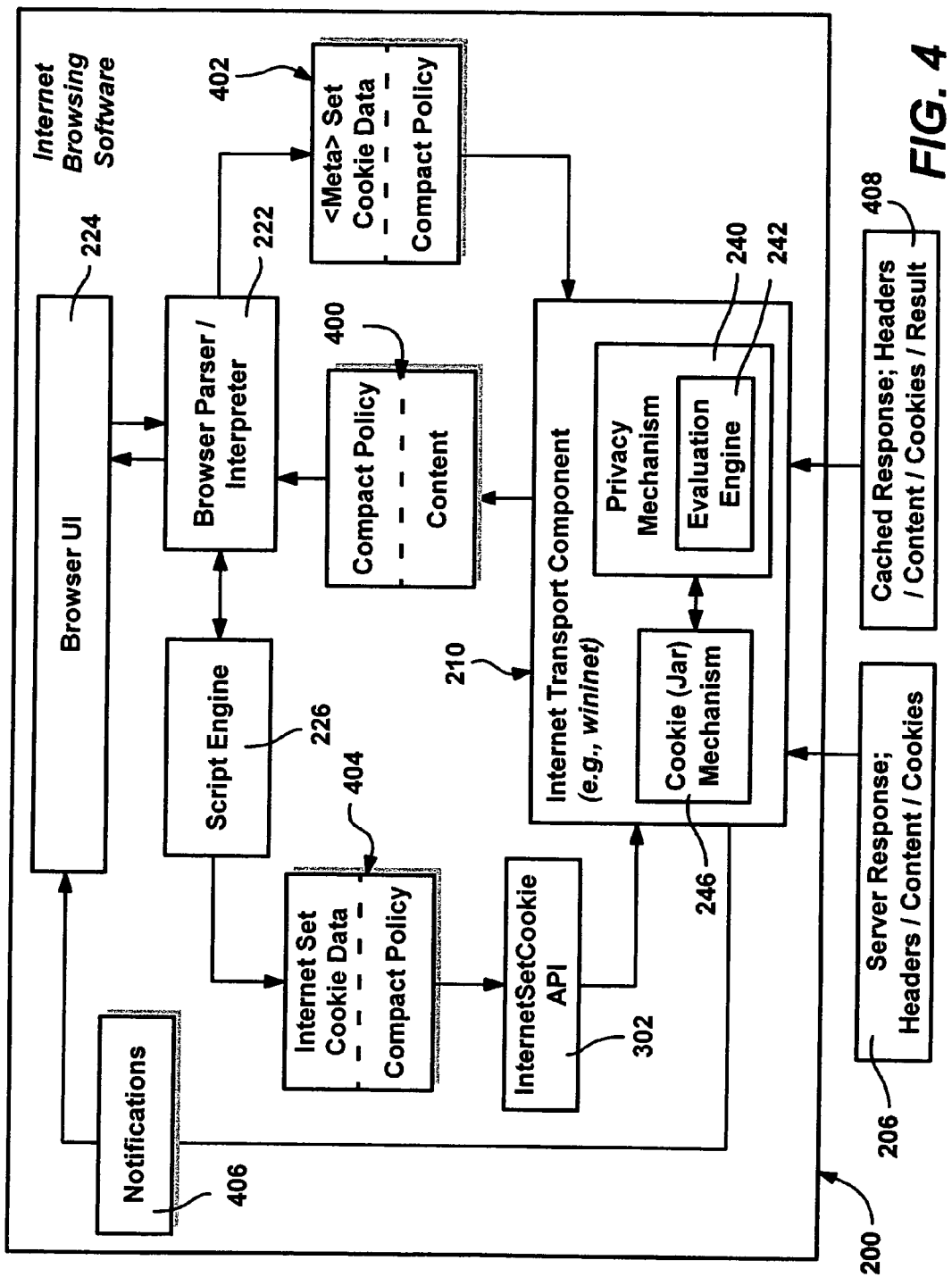
FIG. 4 is a block diagram generally representing data exchanged among components to provide internet privacy evaluation in accordance with one aspect of the present invention.

Turning to FIG. 4, as described above, cookies can be accessed by HTML interpretation (e.g., via a cookie-related meta set cookie tag). To this end, the internet transport component 210 provides the compact policy and content 400 to the browser interpreter/parser component 222. When such a meta tag is detected, the browser interpreter/parser component 222 sends the set cookie command and the compact policy data, represented as the block 402, back to the internet transport component 210. Other information such as the first or third party context also may be provided. In turn, the cookie jar 246 Invokes the evaluation engine 242 (as generally described above in FIG. 3 via HTTP response handling 300) with respect to the privacy mechanism 240. In accordance with an aspect of the present invention, the evaluation engine 242 then specifies an action (e.g., allows, denies, prompts for, leashes or downgrades) the requested cookie-related operation based on the various criteria, e.g., user settings, zone, P3P compact policy, per-site data, type of cookie and so on as described herein. Other cookie-related operations (e.g., replay) occur similarly.

Cookie operations from script are handled in a similar manner. For example, when cookies are set from script, the same general series of steps is taken in evaluating the cookie operation. The InternetSetCookie API 302 is called directly to set the cookie from the script engine 226. In turn, the InternetSetCookie API 302 calls into the cookie jar 246, which calls into the evaluation engine 242 as appropriate. The extra information 404 needed to make the evaluation is passed with the call, including the P3P compact policy to evaluate for this operation. Also, the first versus third party context of the operation is provided, e.g., as determined previously by the browser interpreter/parser component 222.

As also represented in FIG. 4, another aspect of the present invention is directed to providing notifications 400 of privacy-related information to applications using the internet transport component 210 platform. In general, any handling of cookies by the internet transport component 210 leads to appropriate notifications provided by the platform to the browser UI 224, (or similarly to applications or other components using the internet transport component 210). These notifications 400 are sent at several different times throughout the processing of the policy, as set forth in the following table:

| NOTIFICATION | EXPLANATION |
|---|---|
| INTERNET_STATUS_COOKIE_SENT | Sent when a cookie is successfully sent on an HTTP request |
| INTERNET_STATUS_COOKIE_RECEIVED | Sent when a cookie is accepted (based on evaluation processing) |
| INTERNET_STATUS_PRIVACY_IMPACTED | Sent when a cookie is somehow modified based on privacy evaluation - downgraded, leashed, or rejected, as described below. |
| INTERNET_STATUS_P3P_HEADER | Sent when a P3P header is found in the HTTP response |
| INTERNET_STATUS_P3P_POLICYREF | Sent when a P3P policy ref is found in the HTTP response |

The received notifications 400 are used by the browser software 200 to populate the various UI elements and present privacy impact information to the user. Any P3P header provided by these notifications may be stored, for later use as appropriate, e.g., during script cookie operations. This policy is received and stored from the notifications 400 described above, and reused as necessary when manipulating script cookies.

As further represented in FIG. 4, (as a cached response 408), content may be received from the cache 230 (FIG. 2). In general, extra information (e.g., the prior evaluation result) may be stored in the cache to keep track of privacy related actions taken at HTTP response time. Notifications are generated when content is replayed from the cache, mimicking behavior seen when a real response is seen.

More particularly, extra processing may be performed when such content 408 is stored in and received from the cache 430, using the information about the state of the cookie handling that is stored along with the cached content. Should such information be present when content is retrieved from the cache instead of the network, an INTERNET_STATUS_COOKIE_HISTORY notification is sent, informing the host of the previous actions taken, including cookies that were accepted, leashed, downgraded, or rejected. This cached information can be used as needed, e.g., to reject a set cookie request that was previously rejected so that the cookie operation determination is consistent with what occurred at the time the response was initially received, handled and cached.

Also, at cache processing time, the P3P compact policy (which is cached with the content) is reevaluated to regenerate the policy related notifications. In this manner, the host gets a comparable set of notifications whether the content is retrieved over the network connection or from the cache.

Note that because the compact policy is available from the cache, it is alternatively feasible to perform an entirely new evaluation when cached content is recalled, which may have a different result since user settings or the like may have changed in the interim.

Figure 5:
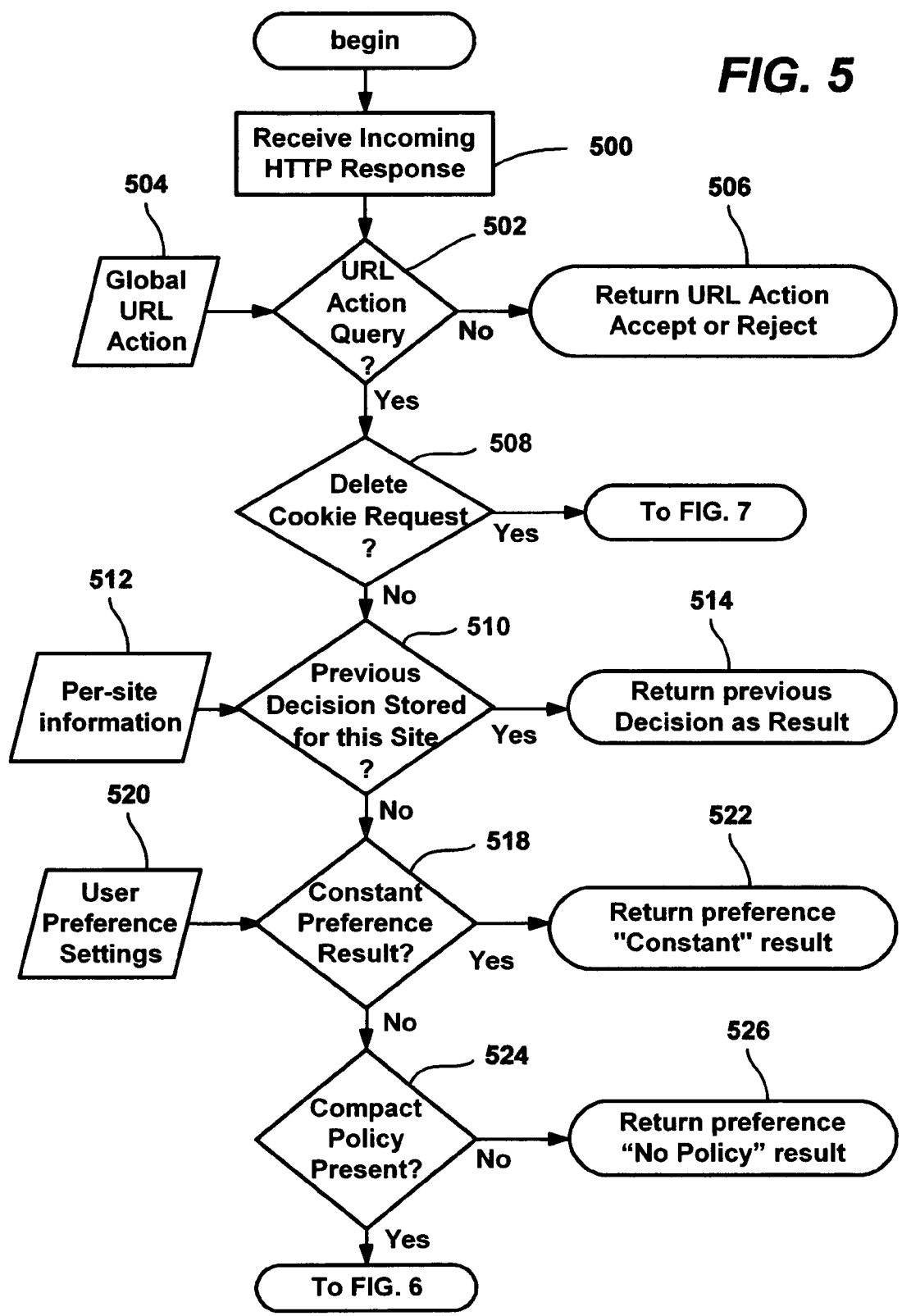
FIGS. 5-7 comprise a flow diagram representing exemplary logic and related operations performed by the evaluation engine to evaluate and determine whether a requested cookie-related operation is allowed or denied in accordance with one aspect of the present invention.
Figure 6:
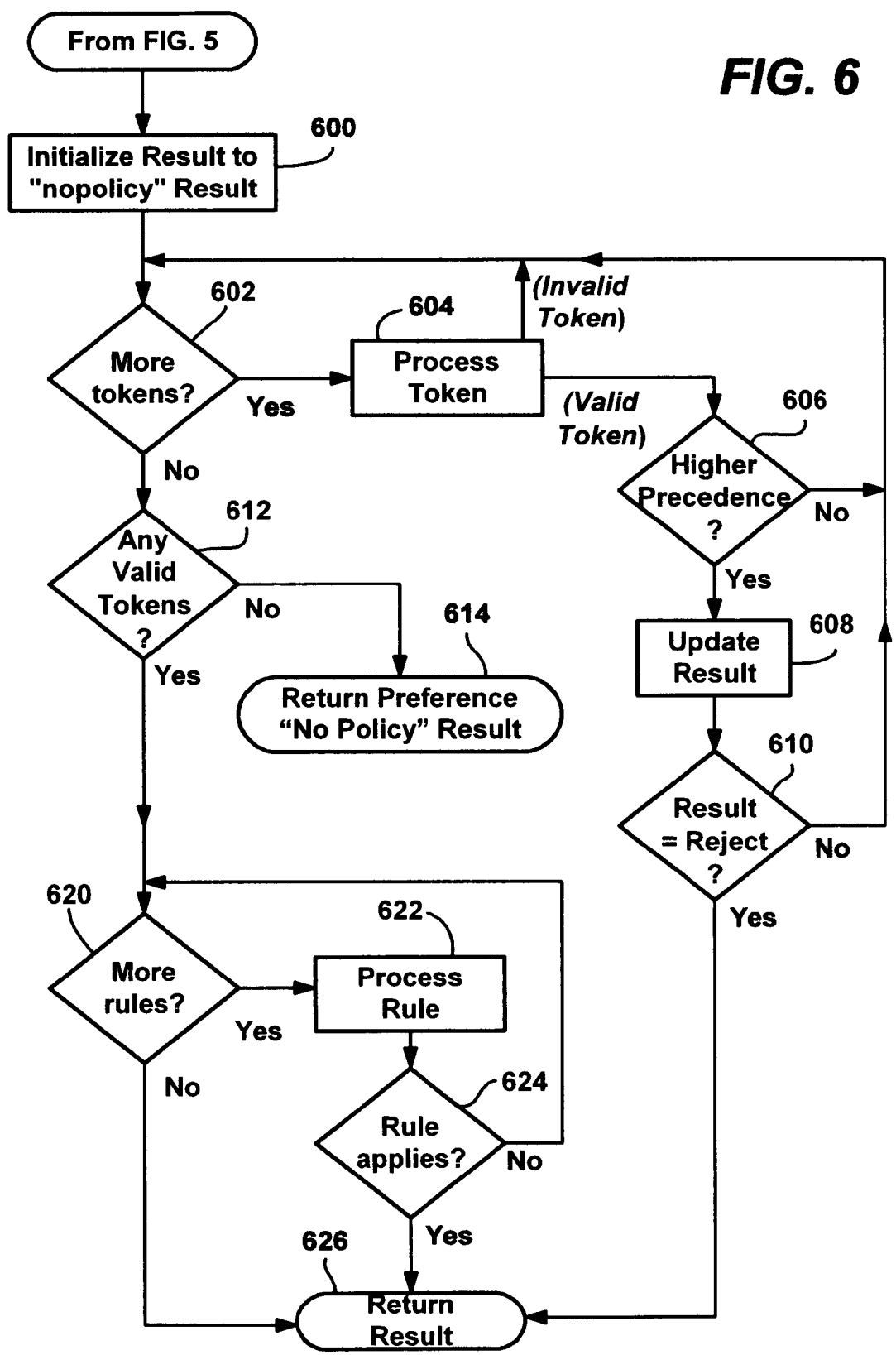
Figure 7:
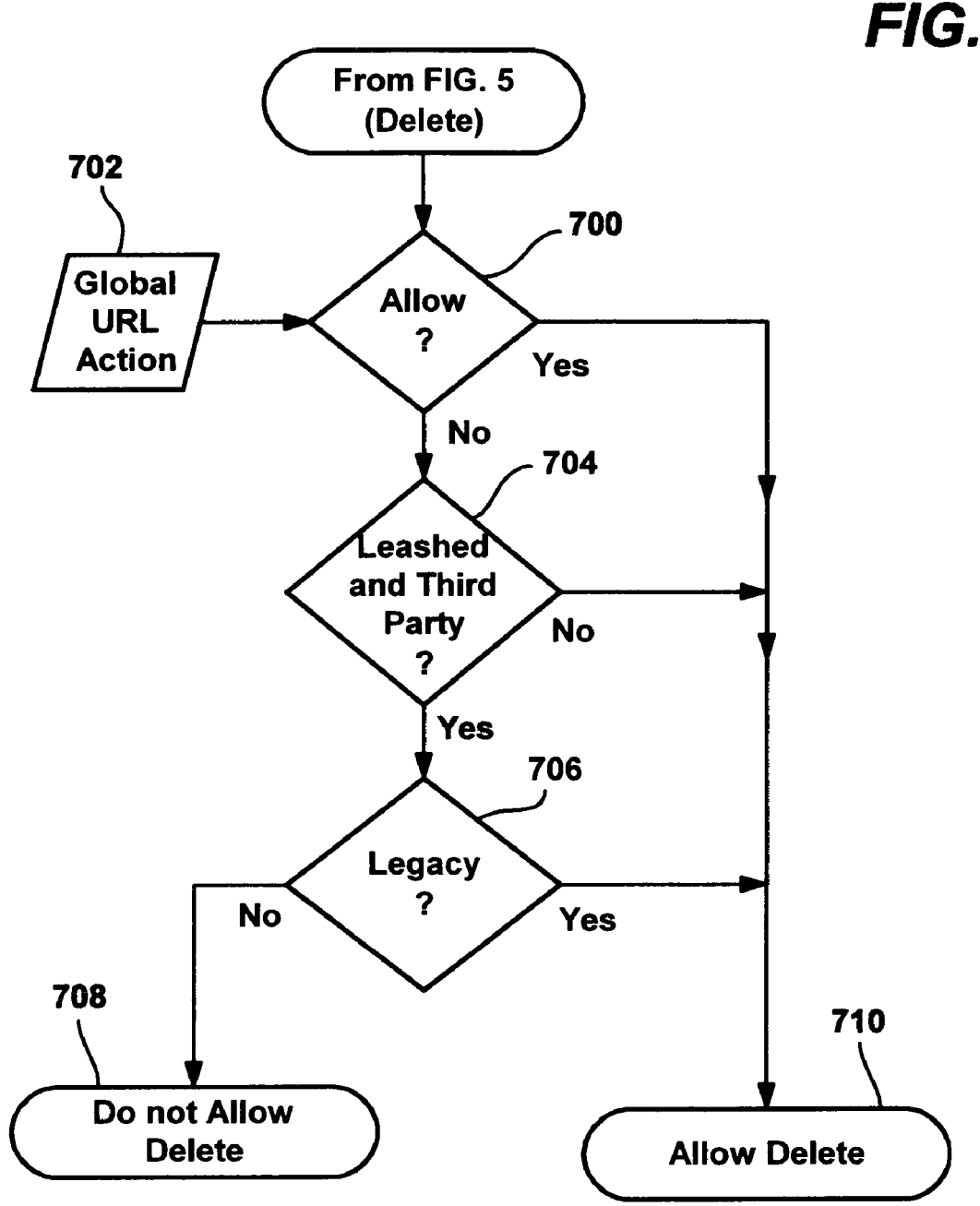

Turning to an explanation of the operation of the privacy mechanism with particular reference to FIGS. 5-7, the evaluation engine generally executes logic to make its determination based on the above-described criteria. Note that the steps of FIGS. 5-7 are only representative of one way to make such a determination, and that there are many ways to accomplish an evaluation and determination. Further, note that many of the steps shown as being performed in and/or by the evaluation engine can be performed by other components, e.g., a security component can enforce a globally applicable cookie rule before the cookie jar 246 is ever involved and thus can block cookies without needing to invoke the evaluation engine. In any event, it is understood that the evaluation engine and the various operations described in FIGS. 5-7 are but one way to accomplish privacy via local control of cookie operations.

Before describing the various operations of the evaluation engine, however, it should be noted that cookies may be stored on a machine prior to the privacy mechanism/evaluation engine of the present invention having been installed and activated on that machine. In other words, when such "legacy" cookies exist prior to installation of the privacy mechanism/evaluation engine, web sites may already have some profile information. One aspect of the present invention is directed to suppressing such cookies in a third party context, in order to prevent such web sites from continuing to gather information. In order to accomplish this, the privacy mechanism automatically disallows third party replays while allowing first party replays, i.e., the privacy mechanism "leashes" legacy cookies when installed. An exception to this general rule is that "opt-out" cookies are left unleashed, since it is assumed that users that have previously opted out of web site services wish to remain opted out. Such opt-out cookies are of the form "ID=OPT_OUT", although several other opt-out cookies already in use in the industry were also specifically excluded, e.g., "AA002=optout" and "CyberGlobalAnonymous=optout".

Beginning at step 500 of FIG. 5, the process generally begins when an incoming HTTP response is received. Note that in one preferred implementation, this HTTP response is not a cached response, since in this implementation, with cached responses, any prior cookie evaluation results are also preserved and reused. However, in an alternate implementation described above, since the compact policy data is cached, the operations of FIGS. 5-7 may also be executed on cached data.

Step 502 represents the testing for the URL query action, that is, the top-level override, which includes looking up the settings for this zone as represented by the input. More particularly, a check URL action comprising a flag that can be queried programmatically can be set to an accept all cookies state, or a reject all cookies state, which map directly to the (e.g., zone-dependent) accept all/reject all privacy levels described above. If set to one of these states, step 502 branches to step 506 to return the accept or reject result.

In keeping with the present invention, a third state of this flag (called "QUERY") allows processing to continue to step 508. Step 508 determines whether the request is to delete a cookie, which is handled as described below with respect to FIG. 7. If not a request to delete, step 508 branches to step 510.

Step 510 represents evaluating any per-site information, accessed via step 512, e.g., by accessing the per-site database (store or list) 304. At step 510, the per-site store is checked to see if there is an action for this URL. This action could have been set a number of ways, e.g., through the browser UI 224. An action may also have been set if the browser previously prompted the user for a decision for this URL, and saved the result of the prompt. If a previous decision exists, step 510 branches to step 514 to return the previous decision for this cookie. If no previous result exists for this URL, the evaluation process continues to step 518.

Step 518, via step 520, reads the user preferences from the user preferences database 310. At this time, the user preferences are queried based on the zone, the first versus third party designation, (made at the beginning of the download) and the persistent or session type to which the cookie corresponds. As described above, one type of preference is a constant preference of the form "always=<result>"; if so, the result is returned at this time via step 518 branching to step 522. For example, a restricted zone site's third party, persistent cookie may be set to "always=reject" while a trusted zone site's first party, session cookie may be set to "always=accept." In such an event, the result is simply returned at step 522. Alternatively, if there is no constant preference stored for the particular set of criteria that pertains to this cookie, step 518 branches to step 524.

Step 524 evaluates whether the site has provided any P3P compact policy in the P3P header 214. Note that sites are not required to provide policy, (however as will be understood, such sites are less likely to get their requested cookie operations allowed). Should no policy be present, a "nopolicy" result (that at least exists by default, and is obtained when the user preferences were previously read at step 520), is returned at step 526. Otherwise, if a policy is present the evaluation process continues to FIG. 6, step 600.

At step 600, a result variable that tracks the determination result that may ultimately be returned is initialized to the "nopolicy" decision read from the user preferences at step 520. As described below, should no valid tokens and/or corresponding rules be found in the evaluation of the compact policy, this "nopolicy" decision will be the result returned.

Step 602 represents the starting of the evaluation of the tokens in the compact policy, until none remain to be processed at step 604, which is branched to if at least one token is present. Note that step 604 skips over invalid (e.g., unrecognized) tokens, and thus if no valid tokens are found in the compact policy, the final result is returned which is the "nopolicy" result initialized above, as represented via steps 612 and 614.

Returning to step 604, for each valid token listed in the compact policy, the user preference rules (read at step 520) are consulted to find a result. For example, the tokens T1 and T4 may have a result of "accept" maintained in the user preference rules for this zone, cookie type criteria, while token T14 of FIG. 2 may have a result of downgrade corresponding thereto in the user settings for the current criteria. The various possible results have a precedence ordering, and the evaluation engine essentially keeps the result that gives the most privacy, with the precedence order comprising reject (highest), downgrade, leash, prompt, or accept (lowest). As can be understood by noting that a higher precedence result at step 606 results in an update to the tracking variable at step 608, this obtaining of the higher precedence (most privacy) result among the tokens is represented via the loop of steps 606, 608 and 610, back to step 602. Thus, in the example of FIG. 2 with tokens T1, T4 and T14 being present in the compact policy, and tokens T1 and T4 being accept, with T14 being downgrade in the user preference settings for this zone and cookie criteria, the updated result ultimately set at step 608 will be to downgrade, via the token T14's corresponding setting. Note that while looping, if any token has a corresponding rule with a result equal to reject, the highest precedence is already known, and there is no point in continuing, whereby step 610 simply ends the evaluation process with the reject result returned via step 626.

Once the tokens in the compact policy have been processed as determined by step 602, step 612 tests whether at least one valid token existed (such as by setting a flag at step 604). If not, step 612 branches to step 614 to return the initialized, "no policy" result, else step 612 branches to step 620 to consult user preference rules.

Step 620 looks for rules, e.g., in the form of rules or logical expressions as described above. As represented via steps 620, 622 and 624, for each rule found in the user preferences (read at step 520), the rule is evaluated against the compact policy. Should the rule be applicable (that is, each binary clause in the rule is true for this policy), the result of the rule is returned as the final result. Note that the first rule to apply ends the loop, with its result returned at step 626, although it is feasible to have a precedence-based arrangement (similar to that above) such that the rule with the highest precedence would win. Note that should no rules apply at step 624, the result that existed when step 620 was first entered (via step 612) is returned.

Turning to FIG. 7, deletion of a cookie occurs when a website sets a cookie with an expiration time in the past. Step 7 represents the following rules that apply when deciding whether or not a cookie can be deleted, namely that leashed cookies cannot be deleted from a third party context unless the URL action allows it, with one exception being legacy cookies that were marked as leashed on upgrade. To this end, step 700 via step 702 tests for the global URL action of allow, in which event the delete is allowed at step 710. Step 704 tests for the prevention of deleting of a leashed and third party cookie, (i.e., deletion is otherwise allowed). Step 706 tests for the legacy cookie exception for leashed and third party cookies, thereby preventing deletion, except for legacy cookies.

As can be seen from the foregoing detailed description, users greatly benefit in privacy from the ability to control the operations on cookies on their computers in a manner that is efficient, flexible and intuitive, yet handles the considerable variety of cookie types and sources.

While the invention is susceptible to various modifications and alternative constructions, certain illustrated embodiments thereof are shown in the drawings and have been described above in derail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a client computer connected to a remote site, a system comprising:
    a mechanism, embodied on a computer-readable storage medium, that receives a response from the remote site, the response including a request directed to a cookie operation and policy information, the policy information comprising a set of at least one valid token in association with the cookie operation;
    a browser component, embodied on a computer-readable storage medium, that handles the response, including recognizing the requested cookie operation;
    one or more computer-readable storage media embodying a cookie mechanism configured to locally perform operations on cookies based on a current privacy setting; and
    an evaluation engine, embodied on a computer-readable storage medium, the evaluation engine invoked to determine whether the cookie mechanism should perform the requested operation based on an evaluation of criteria available to the client computer including the policy information, the criteria comprising:
        a first valid token in the set of valid tokens in association with a first privacy result; and
        a second valid token in the set of valid tokens in association with a second privacy result;
    the evaluation engine further configured to:
        compare the first privacy result with the current privacy setting,
        set the current privacy setting to correspond to the first privacy result if the first privacy result provides more privacy than the current privacy setting,
        compare the second privacy result with the current privacy setting, and
        set the current privacy setting to correspond to the second privacy result if the second privacy result provides more privacy than the current privacy setting.

2. The system of claim 1 wherein the evaluation engine accesses a per-site database to obtain information corresponding to at least some of the criteria.

3. The system of claim 1 wherein the evaluation engine evaluates the cookie to determine whether it is a persistent or session cookie.

4. The system of claim 1 wherein the evaluation engine evaluates the cookie with respect to the remote site to determine whether it is a first party or a third party cookie.

5. The system of claim 1 wherein the evaluation engine obtains information corresponding to a zone for the remote site to determine whether the cookie mechanism should perform the requested operation.

6. The system of claim 1 wherein the requested cookie operation is a request to store the cookie, and wherein the current privacy setting is set to deny the request.

7. The system of claim 1 wherein the requested cookie operation is a request to store the cookie as a persistent cookie, and wherein the current privacy setting is set to downgrade the request so as to store the cookie as a session cookie.

8. The system of claim 1 wherein the requested cookie operation is a request to store the cookie, and wherein the current privacy setting is set to store the cookie as a leashed cookie such that the cookie will not be allowed to be replayed in a third party context.

9. The system of claim 1 wherein the requested cookie operation is a request to store the cookie, and wherein the current privacy setting is set to provide a prompt to obtain additional user information regarding storing the cookie.

10. The system of claim 1 wherein the evaluation engine is further configured to determine whether the token is valid.

11. The system of claim 1 wherein the evaluation engine is further configured to access at least one database based on each valid token in the set to provide a privacy result for each valid token.

12. The system of claim 11, wherein the evaluation engine is further configured to select one of a plurality of privacy results to be the current privacy result.

13. The system of claim 11, wherein the evaluation engine is further configured to select one of the plurality of privacy results to be the current privacy result, wherein a selected one of the plurality of privacy results comprises a most privacy of the plurality of privacy results based on a precedence ordering of the plurality of privacy results.

14. The system of claim 1 wherein the criteria comprises information based on at least one of a zone corresponding to the site, a first party cookie versus third party cookie distinction, or a persistent cookie versus session cookie distinction.

15. One or more computer-readable storage media embodying computer-executable instructions which, when executed, implement a method comprising:
receiving a response from a remote site, the response including a request directed to a cookie operation and policy information, the policy information comprising a set of at least one valid token;
evaluating the policy information against one or more criteria to provide a privacy result by processing the set of at least one valid token, the evaluating comprising,
determining that the policy information is valid;
selecting a valid token from the set of at least one valid token;
obtaining a privacy result corresponding to a selected token;
determining whether an obtained privacy result denies the cookie operation;
in response to determining that the obtained privacy result denies the cookie operation, setting a current privacy result to deny the requested operation and returning the current privacy result;
in response to determining that the obtained privacy result allows the cookie operation, determining whether the obtained privacy result provides more privacy than a current privacy result; and
if the obtained privacy result provides more privacy than the current privacy result, setting the current privacy result to match the obtained privacy result to create a new current privacy result and returning the new current privacy result; and
controlling the requested cookie operation based on the new current privacy result.

16. The one or more computer-readable storage media of claim 15 wherein the requested cookie operation is to store the cookie as a persistent cookie, and wherein the new current privacy result is provided such that controlling the requested cookie operation downgrades the requested cookie operation so as to store the cookie as a session cookie.

17. The one or more computer-readable storage media of claim 15 wherein the requested cookie operation is to store the cookie, and wherein the new current privacy result is provided such that controlling the requested cookie operation stores the cookie as a leashed cookie, the leashed cookie configured to prevent any replay of the cookie.

18. The one or more computer-readable storage media of claim 15 wherein the requested cookie operation is to store the cookie, and wherein a new current privacy result is provided such that controlling the requested cookie operation provides a prompt to obtain additional user information regarding storing the cookie.

19. The one or more computer-readable storage media of claim 15 wherein the requested cookie operation is to store the cookie, and wherein the new current privacy result is provided such that controlling the requested cookie operation denies the request.

* * * * *

UNITED STATES PATENT AND TRADEMARK OFFICE
CERTIFICATE OF CORRECTION

| | | |
|---|---|---|
| PATENT NO. | : 7,614,002 B2 | Page 1 of 1 |
| APPLICATION NO. | : 11/174259 | |
| DATED | : November 3, 2009 | |
| INVENTOR(S) | : Aaron R. Goldfeder et al. | |

It is certified that error appears in the above-identified patent and that said Letters Patent is hereby corrected as shown below:

In column 5, line 31, after "include" insert -- a --.

Signed and Sealed this
Twenty-second Day of February, 2011

David J. Kappos
*Director of the United States Patent and Trademark Office*